(12) United States Patent
Zhou et al.

(10) Patent No.: US 12,309,843 B2
(45) Date of Patent: May 20, 2025

(54) TECHNIQUES FOR TIMING ADVANCE MAINTENANCE FOR DEACTIVATED CELLS BASED ON A RANDOM ACCESS CHANNEL OPERATION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/818,590

(22) Filed: Aug. 9, 2022

(65) Prior Publication Data
US 2024/0057167 A1  Feb. 15, 2024

(51) Int. Cl.
*H04W 74/08* (2024.01)
*H04W 74/0833* (2024.01)

(52) U.S. Cl.
CPC .............. *H04W 74/0833* (2013.01)

(58) Field of Classification Search
CPC ............. H04W 56/00; H04W 56/0005; H04W 56/001; H04W 56/004; H04W 56/0045; H04W 56/0055; H04W 56/0065; H04W 56/0095; H04W 74/00; H04W 74/006; H04W 74/0833; H04W 74/0836; H04W 74/0838; H04W 74/0891
See application file for complete search history.

(56) References Cited

U.S. PATENT DOCUMENTS

| | | | | |
|---|---|---|---|---|
| 10,159,110 B2 * | 12/2018 | Yamada | ................ | H04L 5/0096 |
| 10,652,928 B2 * | 5/2020 | Dinan | ................ | H04W 74/006 |
| 11,197,258 B2 * | 12/2021 | Park | ................ | H04W 72/02 |
| 11,956,690 B2 * | 4/2024 | Kung | ................ | H04W 36/0011 |
| 12,004,026 B2 * | 6/2024 | Kung | ................ | H04L 5/001 |

(Continued)

FOREIGN PATENT DOCUMENTS

| | | |
|---|---|---|
| WO | WO-2022031207 A1 | 2/2022 |
| WO | WO-2022155170 A1 | 7/2022 |

OTHER PUBLICATIONS

International Search Report and Written Opinion—PCT/US2023/070040—ISA/EPO—Nov. 9, 2023.

(Continued)

*Primary Examiner* — Frank Duong
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive configuration information indicative of one or more random access channel (RACH) resources for transmitting a RACH message to maintain timing advance (TA) associated with at least one deactivated cell corresponding to a TA group. The UE may transmit a RACH message to a network node corresponding to the at least one deactivated cell, wherein the RACH message is indicative of first TA information associated with the at least one deactivated cell. Numerous other aspects are described.

30 Claims, 11 Drawing Sheets

(56) References Cited

U.S. PATENT DOCUMENTS

2021/0385708 A1* 12/2021 Damnjanovic . H04W 36/00835
2023/0199638 A1* 6/2023 Kung .................... H04W 48/20
370/328

OTHER PUBLICATIONS

Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, p. 4, Figure 4, Section 2, Paragraph [02.5], Paragraph [02.6], pp. 1-5, Sections 2.1, 2.4.

* cited by examiner

TECHNIQUES FOR TIMING ADVANCE MAINTENANCE FOR DEACTIVATED CELLS BASED ON A RANDOM ACCESS CHANNEL OPERATION

FIELD OF THE DISCLOSURE

Aspects of the present disclosure generally relate to wireless communication and to techniques and apparatuses for timing advance maintenance for deactivated cells based on a random access channel operation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a network node associated with at least one deactivated cell corresponding to a timing advance group (TAG). The method may include receiving a RACH message from a user equipment (UE), wherein the RACH message is indicative of first TA information associated with the at least one deactivated cell. The method may include updating a TA estimation associated with the at least one deactivated cell based on the first TA information.

Some aspects described herein relate to a UE for wireless communication. The UE may include a memory and one or more processors coupled to the memory. The one or more processors may be configured to receive configuration information indicative of one or more RACH resources for transmitting a RACH message to maintain TA associated with at least one deactivated cell corresponding to a TAG. The one or more processors may be configured to transmit a RACH message to a network node corresponding to the at least one deactivated cell, wherein the RACH message is indicative of first TA information associated with the at least one deactivated cell.

Some aspects described herein relate to a network node associated with at least one deactivated cell corresponding to a TAG. The network node associated with at least one deactivated cell corresponding may include a memory and one or more processors coupled to the memory. The one or more processors may be configured to receive a RACH message from a UE, wherein the RACH message is indicative of first TA information associated with the at least one deactivated cell. The one or more processors may be configured to update a TA estimation associated with the at least one deactivated cell based on the first TA information.

Some aspects described herein relate to a non-transitory computer-readable medium that stores a set of instructions for wireless communication by a UE. The set of instructions, when executed by one or more processors of the UE, may cause the UE to receive configuration information indicative of one or more RACH resources for transmitting a RACH message to maintain TA associated with at least one deactivated cell corresponding to a TAG. The set of instructions, when executed by one or more processors of the UE, may cause the UE to transmit a RACH message to a network node corresponding to the at least one deactivated cell, wherein the RACH message is indicative of first TA information associated with the at least one deactivated cell.

Some aspects described herein relate to a non-transitory computer-readable medium that stores a set of instructions for wireless communication by a network node associated with at least one deactivated cell corresponding to a TAG. The set of instructions, when executed by one or more processors of the TAG, may cause the TAG to receive a RACH message from a UE, wherein the RACH message is indicative of first TA information associated with the at least one deactivated cell. The set of instructions, when executed by one or more processors of the TAG, may cause the TAG to update a TA estimation associated with the at least one deactivated cell based on the first TA information.

Some aspects described herein relate to an apparatus for wireless communication. The apparatus may include means for receiving configuration information indicative of one or more RACH resources for transmitting a RACH message to maintain TA associated with at least one deactivated cell corresponding to a TAG. The apparatus may include means for transmitting a RACH message to a network node corresponding to the at least one deactivated cell, wherein the RACH message is indicative of first TA information associated with the at least one deactivated cell.

Some aspects described herein relate to an apparatus associated with at least one deactivated cell corresponding to a TAG. The apparatus may include means for receiving a RACH message from a UE, wherein the RACH message is indicative of first TA information associated with the at least one deactivated cell. The apparatus may include means for updating a TA estimation associated with the at least one deactivated cell based on the first TA information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
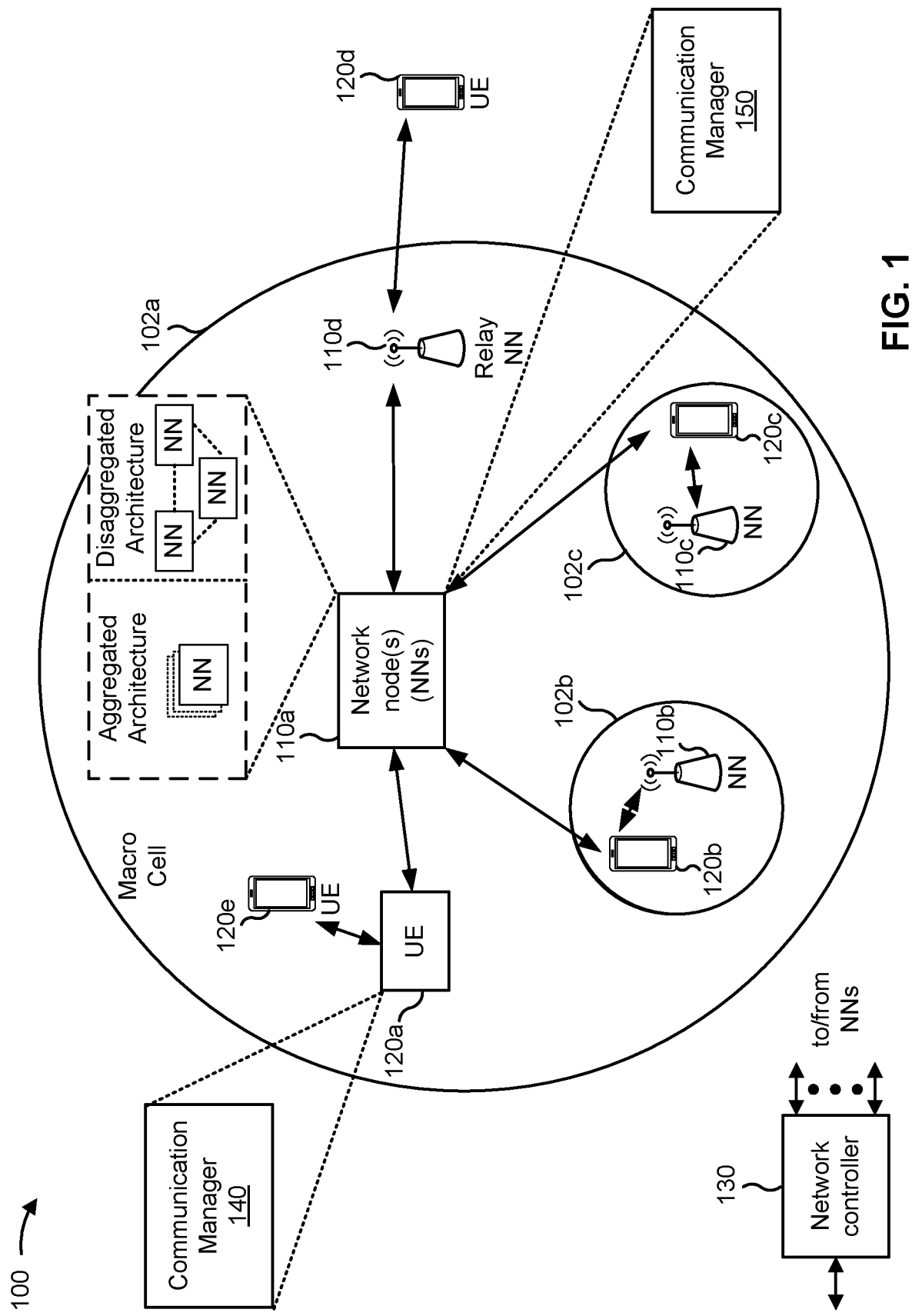
FIG. 1 is a diagram illustrating an example of a wireless network.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (IC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive configuration information indicative of one or more random access channel (RACH) resources for transmitting a RACH message to maintain timing advance (TA) associated with at least one deactivated cell corresponding to a TA group (TAG); and transmit a RACH message to a network node corresponding to the at least one deactivated cell, wherein the RACH message is indicative of first TA information associated with the at least one deactivated cell. Additionally, or alternatively, the communication manager 140 may perform one or more other operations described herein.

In some aspects, the network node 110 may include a communication manager 150. As described in more detail elsewhere herein, the communication manager 150 may receive RACH message from a UE, wherein the RACH message is indicative of first TA information associated with the at least one deactivated cell; and update a TA estimation associated with the at least one deactivated cell based on the first TA information. Additionally, or alternatively, the communication manager 150 may perform one or more other operations described herein.

As indicated above, FIG. 1 is provided as an example. Other examples may differ from what is described with regard to FIG. 1.

Figure 2:
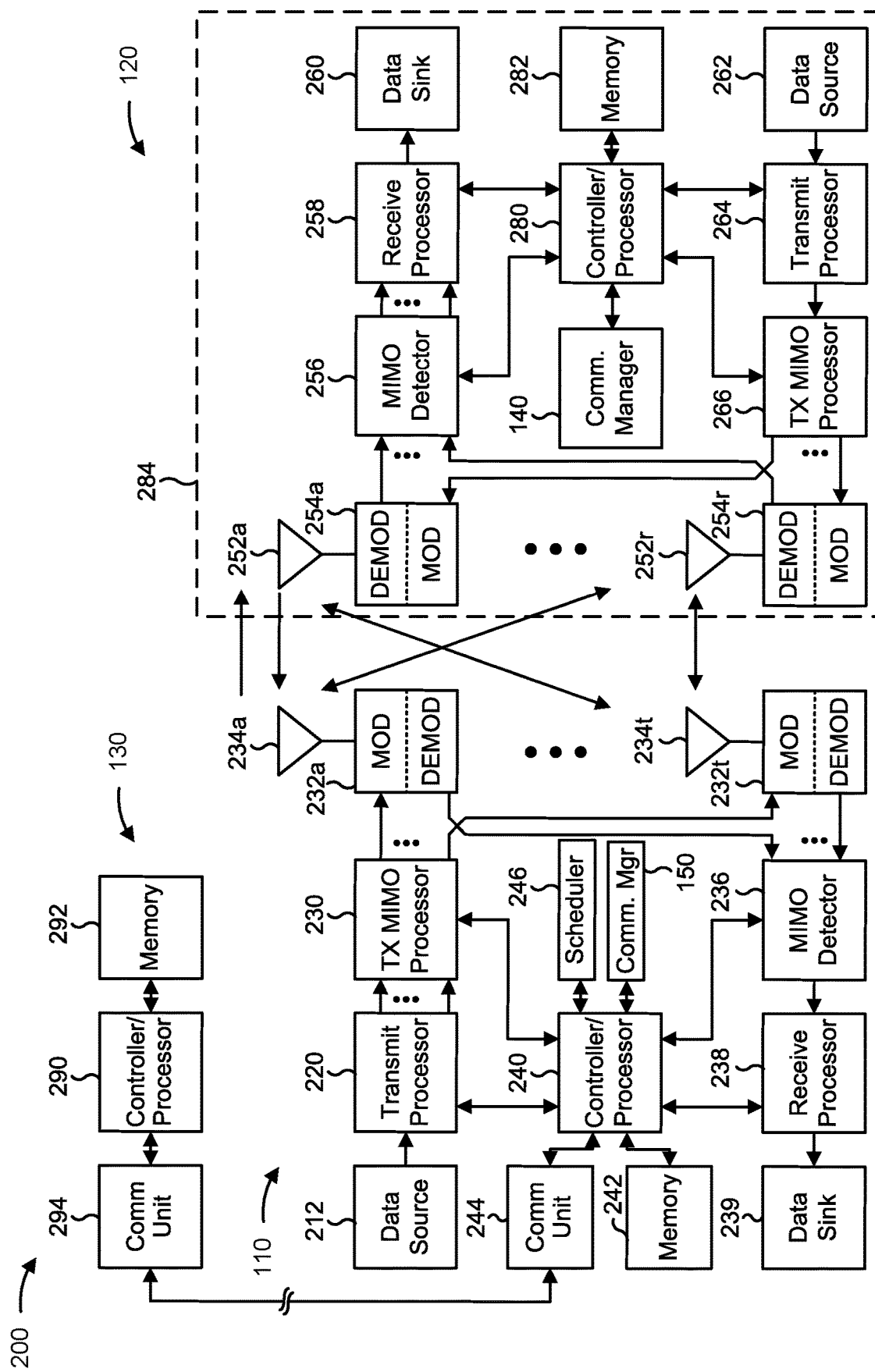
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array)

can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 5-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 5-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with TA maintenance for deactivated cells based on a RACH operation, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving configuration information indicative of one or more RACH resources for transmitting a RACH message to maintain TA associated with at least one deactivated cell corresponding to a TAG; and/or means for transmitting a RACH message to a network node corresponding to the at least one deactivated cell, wherein the RACH message is indicative of first TA information associated with the at least one deactivated cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving a RACH message from a UE, wherein the RACH message is indicative of first TA information associated with the at least one deactivated cell; and/or means for updating a TA estimation associated with the at least one deactivated cell based on the first TA information. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
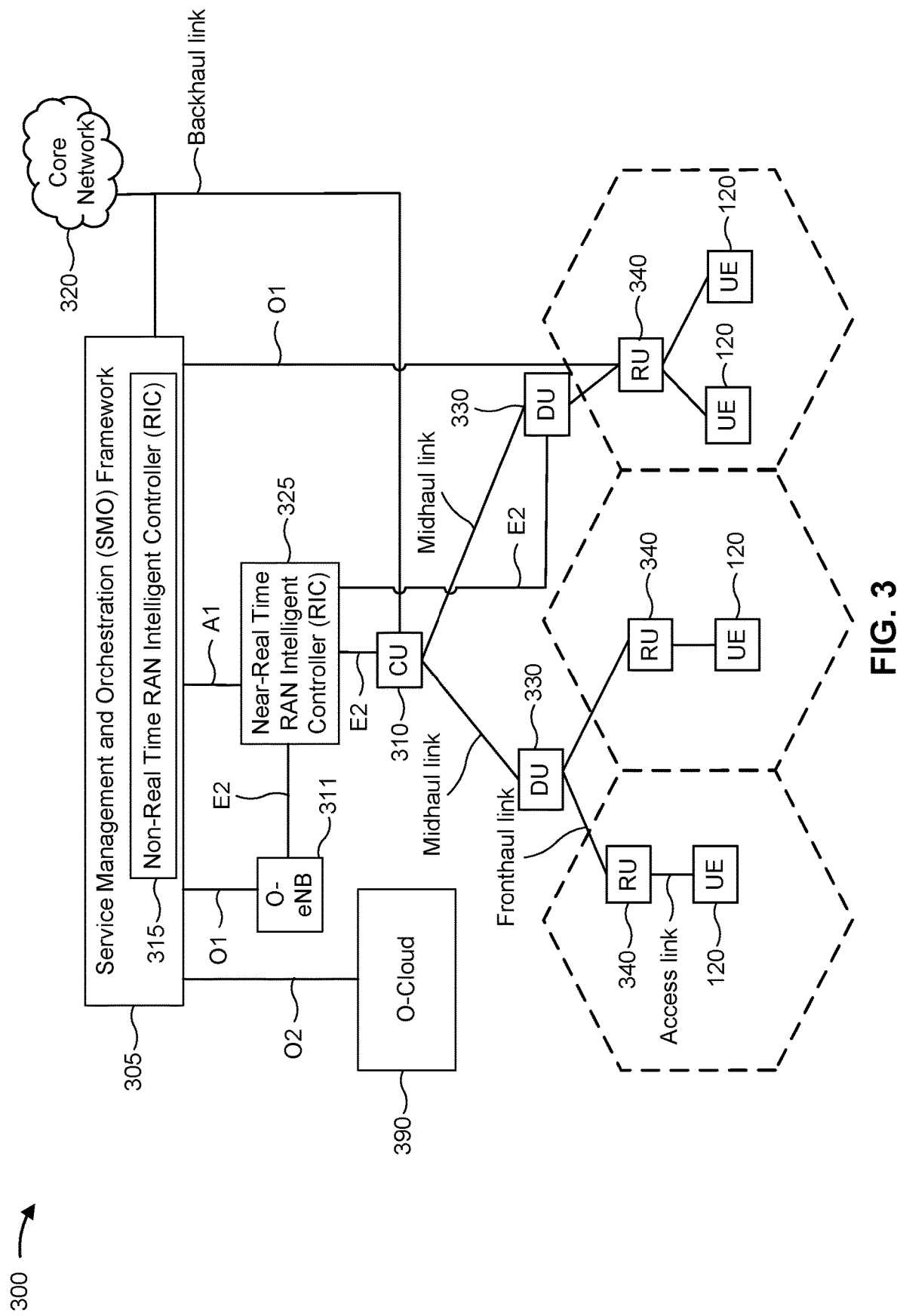
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
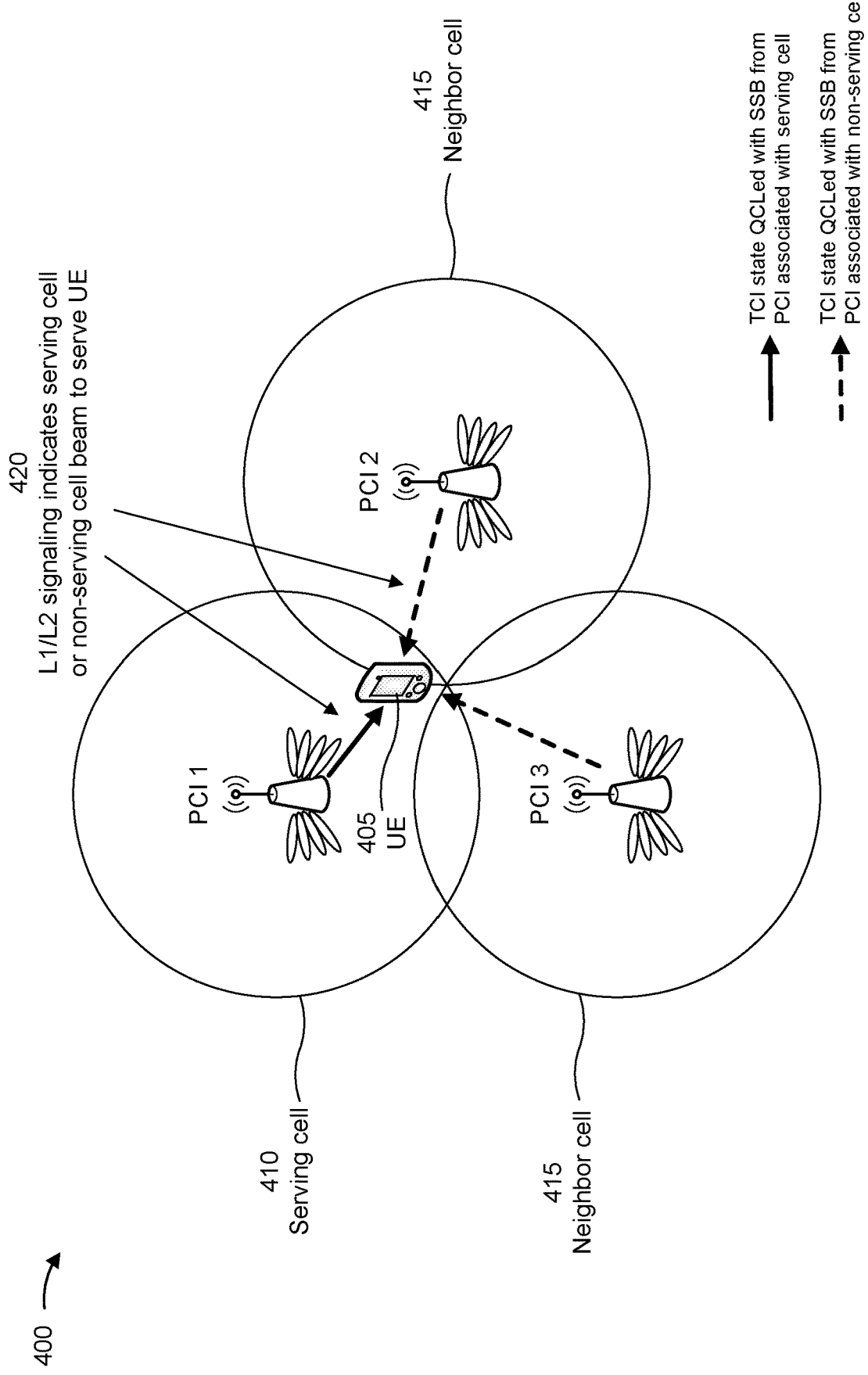
FIGS. 4A and 4B are diagrams illustrating examples of layer 1 and/or layer 2 inter-cell mobility, in accordance with the present disclosure.
Figure 4B:
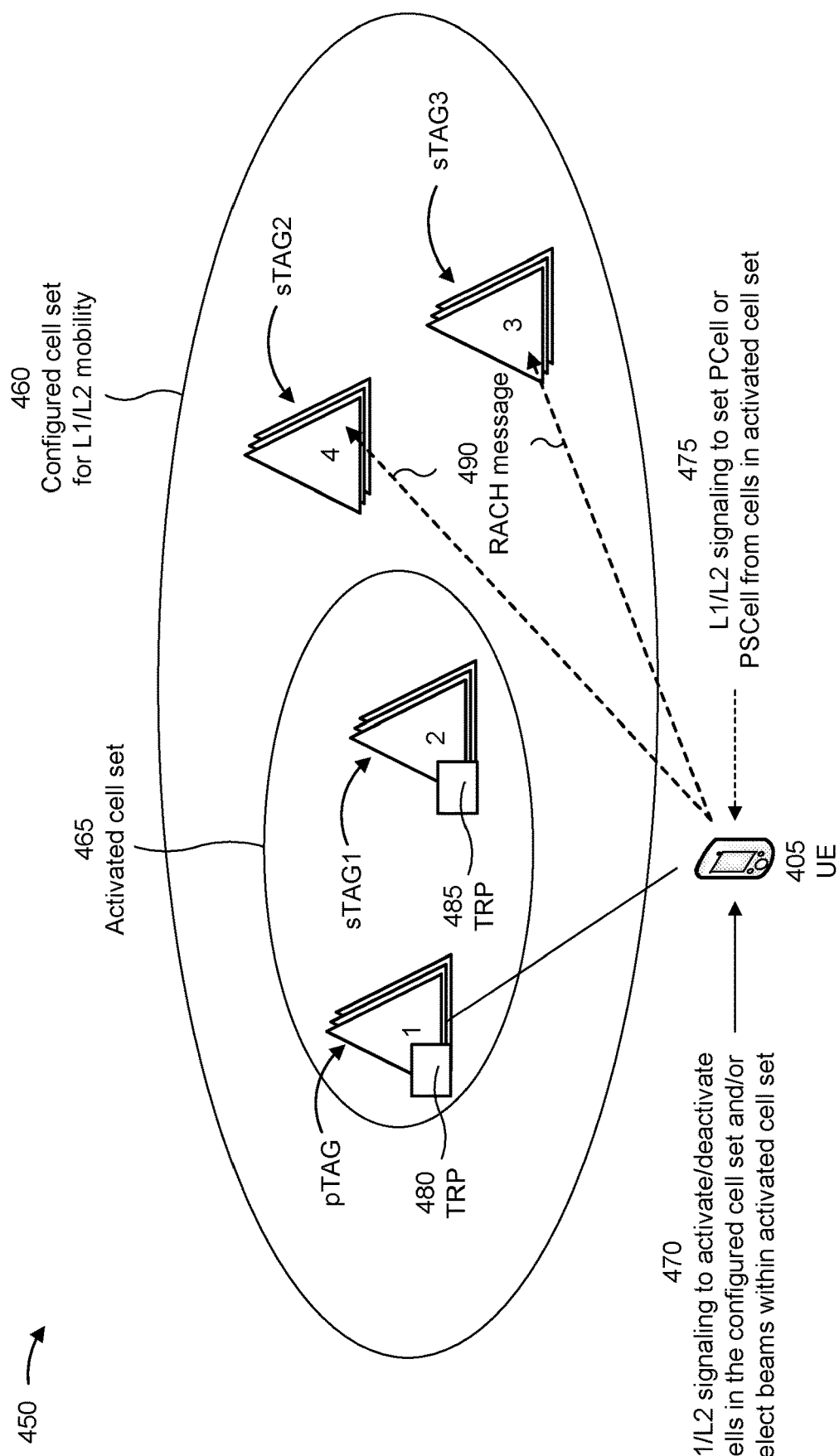

FIGS. 4A and 4B are diagrams illustrating examples 400, 450 of L1/L2 inter-cell mobility, in accordance with the present disclosure.

In a wireless network, such as an NR network, a UE and a network node (e.g., a base station or one or more units or components performing base station functionality) may communicate on an access link using directional links (e.g., using high-dimensional phased arrays) to benefit from a beamforming gain and/or to maintain acceptable communication quality. The directional links, however, typically require fine alignment of transmit and receive beams, which may be achieved through a set of operations referred to as beam management and/or beam selection, among other examples. Further, a wireless network may support multi-beam operation in a relatively high carrier frequency (e.g., within FR2), which may be associated with harsher propagation conditions than comparatively lower carrier frequencies. For example, relative to a sub-6 gigahertz (GHz) band, signals propagating in a millimeter wave frequency band may suffer from increased pathloss and severe channel intermittency, and/or may be blocked by objects commonly present in an environment surrounding the UE (e.g., a building, a tree, and/or a body of a user, among other examples). Accordingly, beam management is particularly important for multi-beam operation in a relatively high carrier frequency.

One possible enhancement for multi-beam operation in a higher carrier frequency is facilitation of efficient (e.g., low latency and low overhead) downlink and/or uplink beam management to support higher layer 1 and/or layer 2 (L1/L2)-centric inter-cell mobility. Accordingly, one goal for L1/L2-centric inter-cell mobility is to enable a UE to perform a cell switch via dynamic control signaling at lower layers (e.g., downlink control information (DCI) for L1 signaling or a medium access control (MAC) control element (MAC CE) for L2 signaling) rather than semi-static Layer 3 (L3) RRC signaling in order to reduce latency, reduce overhead, and/or otherwise increase efficiency of the cell switch.

For example, FIG. 4A illustrates an example 400 of a first L1/L2 inter-cell mobility technique, which may be referred to as inter-cell mobility scheme 1, beam-based inter-cell mobility, dynamic point selection based inter-cell mobility, and/or non-serving cell-based inter-cell mobility, among other examples. As described in further detail herein, the first L1/L2 inter-cell mobility technique may enable a network node to use L1 signaling (e.g., DCI) or L2 signaling (e.g., a MAC-CE) to indicate that a UE 405 is to communicate on an access link using a beam from a serving cell or a non-serving cell. For example, in a wireless network where L1/L2 inter-cell mobility is not supported (e.g., cell switches are triggered only by an L3 handover), beam selection for control information and for data is typically limited to beams within a physical cell identifier (PCI) associated with a serving cell. In contrast, in a wireless network that supports the first L1/L2 inter-cell mobility technique (e.g., as shown in FIG. 4A), beam selection for control and data may be expanded to include any beams within a serving cell 410 or one or more non-serving neighbor cells 415 configured for L1/L2 inter-cell mobility.

For example, in the first L1/L2 inter-cell mobility technique shown in FIG. 4A, a UE 405 may be configured with a single serving cell 410, and the UE 405 may be further configured with a neighbor cell set that includes one or more non-serving cells 415 configured for L1/L2 inter-cell mobility. In general, the serving cell 410 and the non-serving cells 415 that are configured for L1/L2 inter-cell mobility may be associated with a common CU and a common DU, or the serving cell 410 and the non-serving cells 415 configured for L1/L2 inter-cell mobility may be associated with a common CU and different DUs. In some aspects, as shown by reference number 420, a base station may trigger L1/L2 inter-cell mobility for a UE using L1/L2 signaling (e.g., DCI or a MAC-CE) that indicates a selected TCI state QCLed with a reference signal (e.g., a synchronization signal block (SSB)) associated with a PCI. For example, in FIG. 4A, the UE may be communicating with the serving cell 410 using a TCI state that is QCLed with an SSB from a PCI associated with the serving cell 410 (e.g., shown as PCI 1 in FIG. 4A), and L1/L2 signaling may trigger inter-cell mobility by indicating that the UE is to switch to communicating using a TCI state that is QCLed with an SSB from a PCI associated with a non-serving neighbor cell 415 (e.g., shown as PCI 2 in FIG. 4A). Accordingly, in the first L1/L2 inter-cell mobility technique, the network node (e.g., the common CU controlling the serving cell 410 and the non-serving neighbor cells 415) may use L1/L2 signaling to select a beam from either the serving cell 410 or a non-serving neighbor cell 415 to serve the UE 405.

In this way, relative to restricting L1/L2 beam selection to beams within the serving cell 410, the first L1/L2 inter-cell mobility technique may be more robust against blocking and may provide more opportunities for higher rank spatial division multiplexing across different cells. However, the first L1/L2 inter-cell mobility technique does not enable support for changing a primary cell (PCell) or a primary secondary cell (PSCell) for a UE 405. Rather, in the first L1/L2 inter-cell mobility technique, triggering a PCell or PSCell change is performed via a legacy L3 handover using RRC signaling. In this respect, the first L1/L2 inter-cell mobility technique is associated with a limitation that L1/L2 signaling can only be used to indicate a beam from the serving cell 410 or a configured neighbor cell 415 while the UE 405 is in the coverage area of the serving cell 410 because L1/L2 signaling cannot be used to change the PCell or PSCell. Accordingly, FIG. 4B illustrates an example 450 of a second L1/L2 inter-cell mobility technique, which may be referred to as inter-cell mobility scheme 2 and/or serving cell-based inter-cell mobility, among other examples. As described in further detail herein, the second L1/L2 inter-cell mobility technique may enable a network node to use L1/L2 signaling (e.g., DCI or a MAC-CE) to indicate control information associated with an activated cell set and/or a deactivated cell set and/or to indicate a change to a PCell or a PSCell within the activated cell set.

For example, as shown in FIG. 4B, the second L1/L2 inter-cell mobility technique may use mechanisms that are generally similar to carrier aggregation to enable L1/L2 inter-cell mobility, except that different cells configured for L1/L2 inter-cell mobility may be on the same carrier frequency. As shown in FIG. 4B, a network node may configure a cell set 460 for L1/L2 inter-cell mobility (e.g., using radio resource control (RRC) signaling) that includes at least a cell 1 ("1"), a cell 2 ("2"), a cell 3 ("3"), and a cell 4 ("4"). As further shown, an activated cell set 465 may include one or more cells in the configured cell set 460 that are activated and ready to use for data and/or control transfer. The activated cell set 465 may include cell 1 and cell 2, for example. Cell 1 may be a PCell and cell 2 may be a PSCell. Accordingly, in the second L1/L2 inter-cell mobility technique, a deactivated cell set may include one or more cells (cell 3 and cell 4) that are included in the cell set 460 configured for L1/L2 inter-cell mobility but are not included in the activated cell set 465. However, the cells that are included in the deactivated cell set can be readily activated, and thereby added to the activated cell set 465, using L1/L2 signaling. Accordingly, as shown by reference number 470, L1/L2 signaling can be used for mobility management of the activated cell set 465. For example, in some aspects, L1/L2 signaling can be used to activate cells within the configured cell set 460 (e.g., to add cells to the activated cell set 465), to deactivate cells in the activated cell set 465, and/or to select beams within the cells included in the activated cell set 465. In this way, the second L1/L2 inter-cell mobility technique may enable seamless mobility among the cells included in the activated cell set 465 using L1/L2 signaling (e.g., using beam management techniques).

Furthermore, as shown by reference number 475, the second L1/L2 inter-cell mobility technique enables using L1/L2 signaling to set or change a PCell or PSCell from the cells that are included in the activated cell set 465. Additionally, or alternatively, when the cell that is to become the new PCell or PSCell is in the deactivated cell set (e.g., is included in the cell set 460 configured for L1/L2 mobility but not the activated cell set 465), L1/L2 signaling can be used to move the cell from the deactivated cell set to the activated cell set 465 before further L1/L2 signaling is used to set the cell as the new PCell or PSCell. However, in the second L1/L2 inter-cell mobility technique, an L3 handover (using RRC signaling) is used to change the PCell or PSCell when the new PCell or PSCell is not included in the cell set 460 configured for L1/L2 inter-cell mobility. In such cases, RRC signaling associated with the L3 handover may be used to update the cells included in the cell set 460 that is configured for L1/L2 inter-cell mobility.

In some aspects, multiple TRPs 480 and 485 may transmit communications (for example, the same communication or different communications) in the same transmission time interval (TTI) (for example, a slot, a mini-slot, a subframe, or a symbol) or different TTIs using different QCL relationships (for example, different spatial parameters, different TCI states, different precoding parameters, or different beamforming parameters). In some aspects, a TCI state may be used to indicate one or more QCL relationships. A TRP 480 may be configured to individually (for example, using dynamic selection) or jointly (for example, using joint transmission with one or more other TRPs 485) serve traffic to a UE 405. In some aspects, the TRP 480 and/or the TRP 485 may be, include, or be included in, one or more network nodes 110 described above in connection with FIGS. 1 and 2. In some examples, different TRPs 480 and 485 may be included in different base stations and/or other network nodes. In some cases, multiple TRPs 480 and 485 may be included in a single base station and/or other network node. In some cases, a TRP 480 and/or a TRP 485 may be referred to as a network node, a cell, a panel, an antenna array, and/or an array.

The cells in the L1/L2 mobility configured cell set 460 can belong to timing TAGs. "TAG" may refer to a group of cells that have the same (or similar within a threshold value) uplink TA values. For example, a first uplink carrier and a second uplink carrier may have different propagation delays between the UE 405 and the TRP 480 associated with cell 1 and between the UE 405 and the TRP 485. For example, the TRP 480 and the TRP 485 may not be co-located with one another, resulting in different propagation delays for uplink transmissions to reach a respective TRP on the different uplink carriers. As a result, the first uplink carrier and the second uplink carrier may have different timing advance values for uplink transmissions and may belong to different TAGs.

The UE 405 may use a timing advance value for an uplink carrier to transmit an uplink communication on the uplink carrier with a timing that results in synchronization of TTIs with a TRP 480 or 485, to reduce inter-TTI interference.

Uplink carriers can be transmitted asynchronously or synchronously. Two or more uplink carriers are typically synchronous when transmitted in the same subband. Two or more uplink carriers can be transmitted synchronously when a single TA command is used to control their timing. The transmission of two or more uplink carriers can be considered to be asynchronous with respect to one another when the transmission of one of the carriers lags the transmission of another of the carriers.

Multiple TAGs can be defined for the UE 405, which can be configured for carrier aggregation. A TAG typically comprises one or more uplink carriers controlled by the same TA commands transmitted from a TRP 480 and/or 485. TAGs can be configured by a serving TRP using dedicated signalling. A physical downlink control channel (PDCCH) order directed to an activated secondary cell in a TAG can initiate a RACH procedure that may result in the use of a PRACH. A PDCCH order may be used, for example, after UL and DL resources have been released and the TRP 480 has DL data to send to the UE 405.

When multiple TAGs are defined for the UE 405, timing differences can exist between uplink carriers transmitted by the UE 405, because the one or more TAGs can have received a TA command different from the TA commands received by the other TAGs. TA commands can cause two or more TAGs to have timing offsets that are different from one another, and these timing differences can be characterized as a relative delay between a pair of TAGs, or between corresponding component carriers, subframes, and/or symbols within the pair of TAGs.

In some cases, a group of co-located component carriers (e.g., cells) can belong to a same TAG. As shown, the configured cell set 460 can include multiple non-co-located TAGs. In some cases, each SCell can be configured to a TAG at the time of addition to the configured cell set 460. The TAG assignment can be determined by a network node (e.g., the TRP 480 and/or the TRP 485). TAG assignments can be based on band operation, existence of repeaters, cell location, and/or UE location, among other examples. To determine initial timing for a pTAG (e.g., a TAG containing a PCell), the UE 405 can perform a RACH procedure. To determine initial timing associated with an sTAG (e.g., a TAG containing only SCells), the UE 405 can perform a RACH procedure associated with one of the SCells belonging to the sTAG. In some cases, a contention-free RACH procedure can be performed upon reception of a PDCCH order from a network node (e.g., the TRP 480 and/or the TRP 485).

TA information of cells in a TAG containing active cells can be regularly updated through TA MAC CE transmitted by a network node. However, for TAG with all deactivated cells, the TA information is typically not regularly updated. Initial TA information associated with deactivated cells can expire or be inaccurate due to UE mobility and/or change of wireless conditions, among other examples. It may be desirable to maintain TA information associated with deactivated cells to facilitate more rapidly obtaining TA information and activating deactivated cells.

Some aspects of the techniques and apparatuses described herein may facilitate efficient TA estimation for TAGs containing only deactivated cells. For example, as shown by reference number 490, the UE 405 may transmit a RACH message that is used for updating TA at the deactivated cells. For example, the RACH message may be indicative of first TA information associated with the at least one deactivated cell. The UE 405 may transmit the RACH message to one cell (e.g., to a network node associated with one cell) in each TAG group that includes only deactivated cells. In some aspects, the network node may update a TA estimation associated with the at least one deactivated cell based on the first TA information. In this way, some aspects may facilitate TA maintenance associated with deactivated cells while minimizing overhead. As a result, when the deactivated cells are activated in the future, accurate TA information is already available to use, and thus, the UE does not need to perform RACH at cell activation to obtain TA information. Consequently, some aspects may improve system performance in terms of increased quality of service (QoS), higher throughput, and/or efficiency, among other examples.

As indicated above, FIGS. 4A and 4B are provided as examples. Other examples may differ from what is described with respect to FIGS. 4A and 4B.

Figure 5:
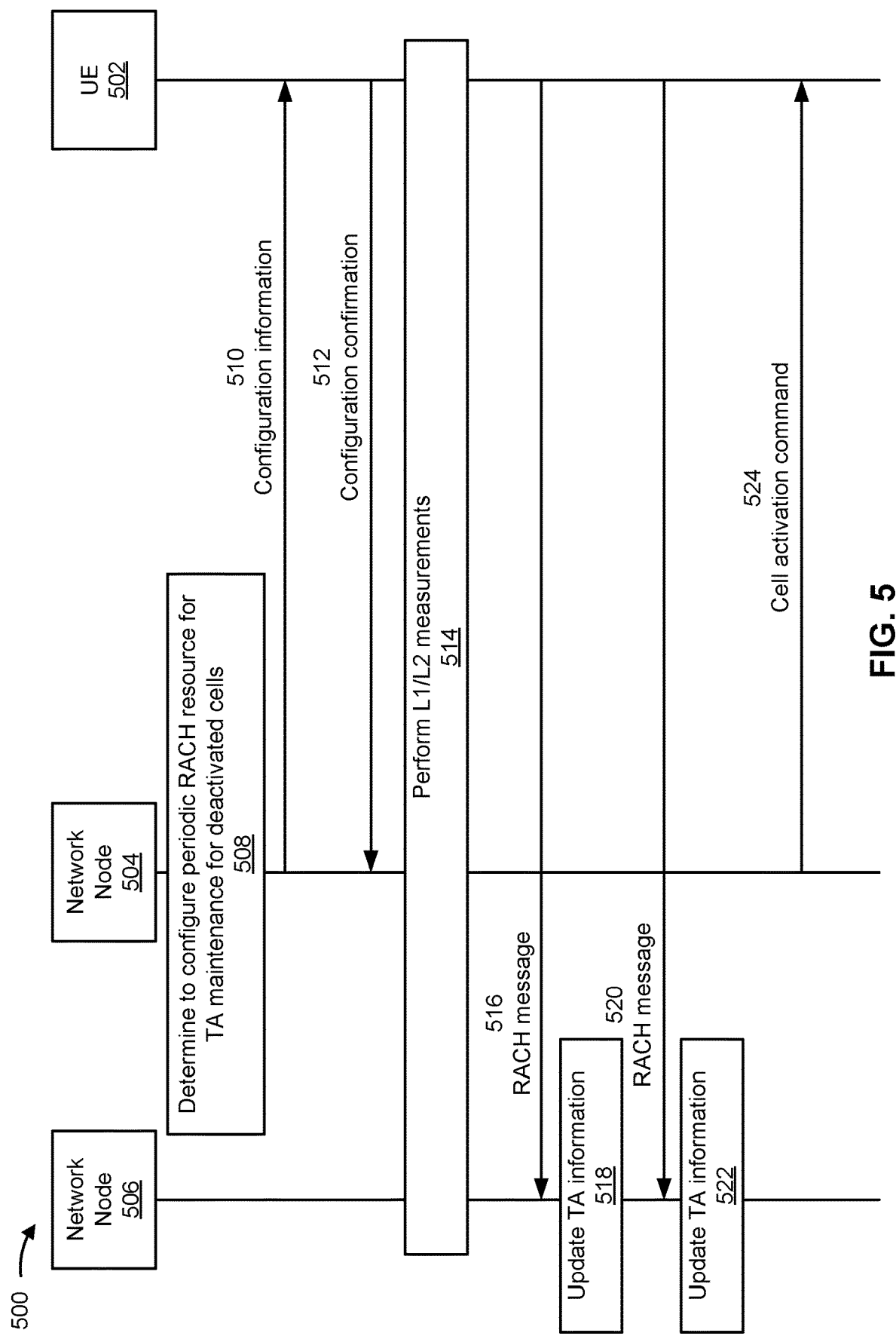
FIG. 5 is a diagram illustrating an example associated with timing advance (TA) maintenance for deactivated cells based on a random access channel (RACH) operation, in accordance with the present disclosure.

FIG. 5 is a diagram illustrating an example 500 associated with TA maintenance for deactivated cells based on a RACH operation, in accordance with the present disclosure. As shown in FIG. 5, a UE 502 may communicate with a network node 504 and a network node 506. The UE 502 may be, be similar to, include, or be included in, the UE 405 depicted in FIGS. 4A and 4B and/or the UE 120 depicted in FIGS. 1 and 2. The network node 504 and/or the network node 506 may be, be similar to, include, or be included in the TRP 480 and/or TRP 485 depicted in FIG. 4B, the network node 110 depicted in FIGS. 1 and 2, and/or one or more components of the disaggregated base station architecture 300 depicted in FIG. 3. The network node 504 may be associated with a source cell (e.g., a currently active cell with which the UE 502 is in a connected state). The source cell also may be referred to as a primary cell. The network node 506 may be associated with a secondary cell (e.g., a deactivated cell). In some aspects, the network node 504 may be, include, or be included in, the network node 506. In example, 500, the UE 502 may be configured to transmit the RACH based on configured RACH occasions (e.g., without being triggered by a network node to do so).

As shown by reference number 508, the network node 504, may determine to configure periodic RACH resources for TA maintenance for deactivated cells. In some aspects, the network node 504 may make the determination based on UE capabilities, cell capabilities, and/or detection of a change in TA information associated with an active cell, among other examples.

As shown by reference number 510, the network node 504 may transmit, and the UE 502 may receive, configuration information. In some aspects, the configuration information may be carried in an RRC message. In some aspects, the configuration information may be referred to as an RRC reconfiguration. The configuration information may correspond to an L1/L2 inter-cell mobility operation associated with an L1/L2 mobility configured cell set. The configuration information may be indicative of the L1/L2 mobility configured cell set (which may be referred to as "the configured cell set"), L1/L2 mobility configurations for each cell in the L1/L2 mobility configured cell set, and/or TAG information associated with each cell in the L1/L2 mobility configured cell set, among other examples.

In some aspects, the configuration information may be indicative of one or more RACH resources for transmitting a RACH message to maintain TA associated with at least one deactivated cell corresponding to a TAG. The one or more RACH resources may include at least one RACH occasion. In some aspects, the configuration information may be indicative of a RACH occasion periodicity associated with the at least one RACH occasion. The one or more RACH resources may include at least one of a frequency domain resource or a time domain resource.

The configuration information may be indicative of the at least deactivated cell. The configuration information may be indicative of at least one additional cell corresponding to the TAG group. In some aspects, the configuration information may be indicative of an additional deactivated cell corresponding to an additional TAG group. In some aspects, the configuration information may be indicative of a periodic RACH transmission configuration corresponding to the RACH message and at least one additional RACH message.

In some aspects, the configuration information may be indicative of a plurality of RACH configurations. The network node 504 may transmit, and the UE 502 may receive, a switch indication that indicates a RACH configuration, of the plurality of RACH configurations, to be used. For example, the network node 504 may transmit, and the UE 502 may receive, the switch indication based on transmitting and receiving, respectively, DCI that includes the switch indication. In some aspects, the network node 504 may transmit, and the UE 502 may receive, the switch indication based on transmitting and receiving, respectively, a MAC CE that includes the switch indication.

As shown by reference number 512, the UE 502 may transmit, and the network node 504 may receive, a configuration confirmation. The configuration confirmation may indicate completion of an RRC reconfiguration process based on the configuration information.

As shown by reference number 514, the UE 502, the network node 504, and/or the network node 506 may perform one or more L1 and/or L2 measurements. For example, the UE 502 may obtain one or more L1 measurements associated with a reference signal transmitted by the network node 504 and/or a reference signal transmitted by network node 506. In some aspects, the L1 measurement may include at least one of an intra-frequency L1 measurement or an inter-frequency L1 measurement. In some aspects, the L1 measurement may correspond to at least one of a time division duplexing (TDD) band or a frequency division duplexing (FDD) band. The L1 measurement may correspond to at least one of a first frequency range (e.g., FR1), a second frequency range (e.g., FR2), a third frequency range (e.g., FR2-1), or a fourth frequency range (e.g., FR2-2).

As shown by reference number 516, the UE 502 may transmit, and the network node 506 may receive, a RACH message. The RACH message may be a Msg1 message of a random access procedure. In some aspects, the RACH message is indicative of first TA information associated with the at least one deactivated cell. The RACH message may be implicitly indicative of the first TA information implicitly. For example, the network node 506 may determine (e.g., calculate or estimate) the first TA information based on receiving the RACH message. In some aspects, the RACH message may include a dedicated random access sequence that indicates that the RACH message is associated with TA maintenance. As shown by reference number 518, the network node 506 may update TA information associated with the at least one deactivated cell based on the first TA information. In some aspects, for example, the first TA information may include a TA value indicated by the RACH message. In some aspects, the first TA information may include a timing associated with the RACH message. The network node 506 may update the TA information associated with the at least one deactivated cell based on determining, based on the first TA information, an updated TA estimate corresponding to the at least one deactivated cell.

As shown by reference number 520, the UE 502 may transmit, and the network node 506 may receive, at least one additional RACH message in accordance with a periodic RACH transmission configuration. As shown by reference number 522, the network node 506 may update the TA information associated with the at least one deactivated cell based on additional first TA information included in the at least one additional RACH message. In some aspects, for example, the network node 506 may update the TA information each time the network node 506 receives a RACH message from the UE 502. In some aspects, the UE 502 may transmit, and an additional network node 506 associated with an additional deactivated cell (e.g., corresponding to an additional TAG), may receive an additional RACH message. Any number of additional RACH messages may be transmitted for TA maintenance associated with any number of additional TAGs comprising deactivated cells.

As shown by reference number 524, the network node 504 may transmit, and the UE 502 may receive, based on the configuration information, a cell activation command. A cell activation command may include a command associated with activation of a cell or deactivation of a cell. The cell activation command may include, for example, a joint TA and cell activation MAC CE that may indicate second TA information associated with the at least one deactivated cell. The second TA information may be based on the first TA information. For example, the second TA information may include the updated TA information associated with the at least one deactivated cell.

Using aspects of the techniques described herein, the RACH messages may be used to maintain current TA information at deactivated cells of TAGs including only deactivated cells, thereby reducing the signaling redundancy associated with transmitting RACH messages at the time of activation to obtain TA information for cell activation. Moreover, because the RACH message depicted in example 500 may be transmitted periodically, without triggering by the network node 504, TA maintenance associated with deactivated cells may be performed without increasing signalling by the network. In this way, some aspects may facilitate more efficient network communications.

As indicated above, FIG. 5 is provided as an example. Other examples may differ from what is described with respect to FIG. 5.

Figure 6:
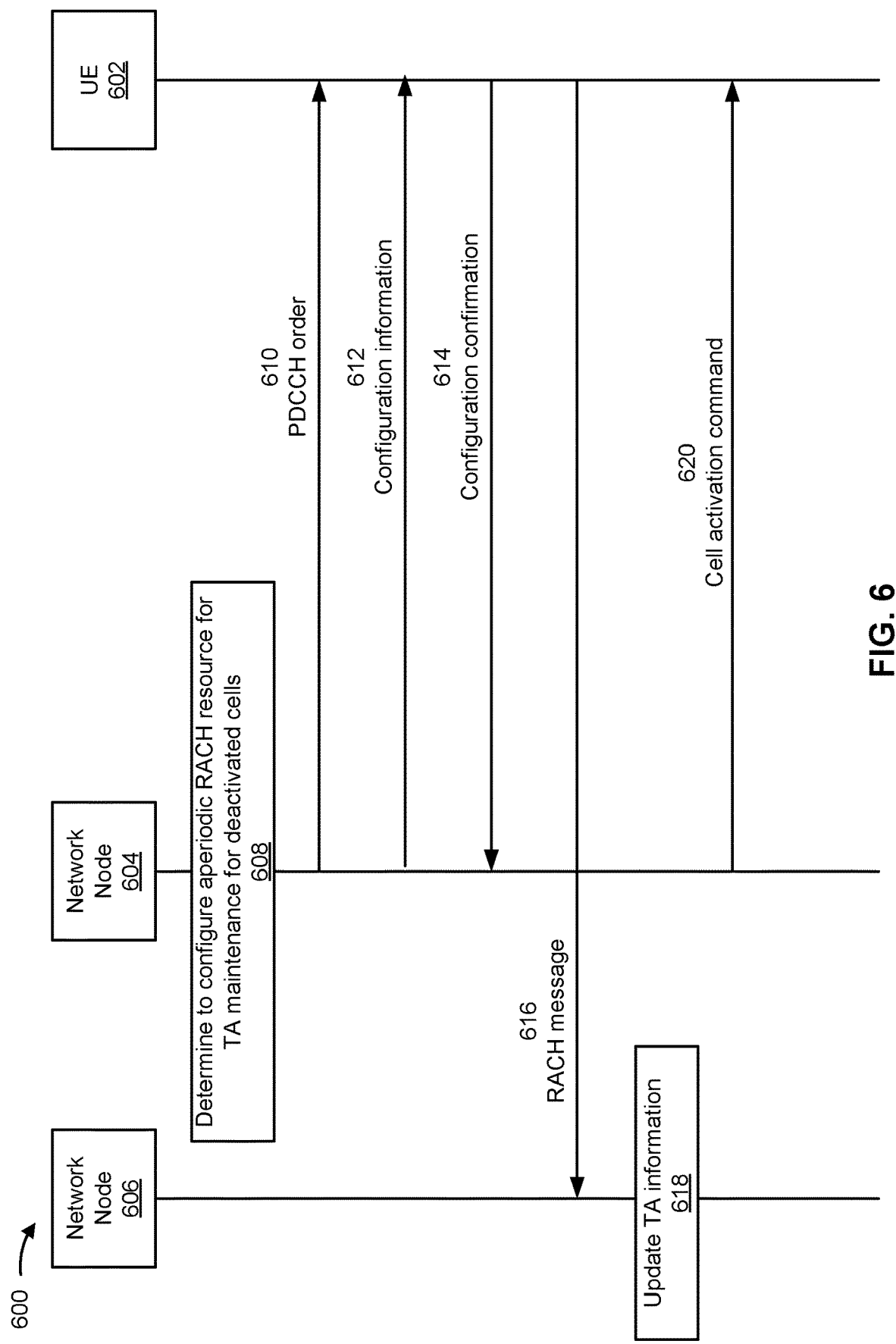
FIG. 6 is a diagram illustrating an example associated with TA maintenance for deactivated cells based on a RACH operation, in accordance with the present disclosure.

FIG. 6 is a diagram illustrating an example 600 associated with TA maintenance for deactivated cells based on a RACH operation, in accordance with the present disclosure. As shown in FIG. 6, a UE 602 may communicate with a network node 604 and a network node 606. The UE 602 may be, be similar to, include, or be included in, the UE 502 depicted in FIG. 5, the UE 405 depicted in FIGS. 4A and 4B and/or the UE 120 depicted in FIGS. 1 and 2. The network node 604 and/or the network node 606 may be, be similar to, include, or be included in the network node 504 and/or the network node 506 depicted in FIG. 5, the TRP 480 and/or TRP 485 depicted in FIG. 4B, the network node 110 depicted in FIGS. 1 and 2, and/or one or more components of the disaggregated base station architecture 300 depicted in FIG. 3. The network node 604 may be associated with a source cell (e.g., a currently active cell with which the UE 602 is in a connected state). The source cell also may be referred to as a primary cell. The network node 606 may be associated with a secondary cell (e.g., a deactivated cell). In some aspects, the network node 604 may be, include, or be included in, the network node 606. In example, 600, the UE 602 may be configured to transmit the RACH based on a triggering from a network node to do so. For example, the RACH message described in connection with example 600 may be a triggered aperiodic RACH message.

As shown by reference number 608, the network node 604, may determine to configure aperiodic RACH resources for TA maintenance for deactivated cells. In some aspects, the network node 604 may make the determination based on UE capabilities, cell capabilities, and/or detection of a change in TA information associated with an active cell, among other examples.

As shown by reference number 610, the network node 604 may transmit, and the UE 602 may receive, a PDCCH order to perform a RACH operation. As shown by reference number 612, the network node 604 may transmit, and the UE 602 may receive, configuration information. In some aspects, at least a portion of the configuration information may be carried in the PDCCH order. In some aspects, at least a portion of the configuration information may be carried in an RRC message. In some aspects, at least a portion of the configuration information may be carried in DCI and/or a MAC CE.

In some aspects, the configuration information may be indicative of one or more RACH resources for transmitting a RACH message to maintain TA associated with at least one deactivated cell corresponding to a TAG. The one or more RACH resources may include at least one RACH occasion. The one or more RACH resources may include at least one of a frequency domain resource or a time domain resource. The configuration information may be indicative of the at least deactivated cell. The configuration information may be indicative of at least one additional cell corresponding to the TAG group. In some aspects, the configuration information may be indicative of an additional deactivated cell corresponding to an additional TAG group. In some aspects, the configuration information may be indicative of a periodic RACH transmission configuration corresponding to the RACH message and at least one additional RACH message.

As shown by reference number 614, the UE 602 may transmit, and the network node 604 may receive, a configuration confirmation. The configuration confirmation may include an acknowledgment (ACK) communication such as a hybrid automatic repeat request (HARD)-ACK transmitted in response to successful receipt of the PDCCH order.

As shown by reference number 616, the UE 602 may transmit, and the network node 606 may receive, a RACH message. In some aspects, the RACH message is indicative of first TA information associated with the at least one deactivated cell. In some aspects, the RACH message may include a dedicated random access sequence that indicates that the RACH message is associated with TA maintenance. As shown by reference number 618, the network node 606 may update TA information associated with the at least one deactivated cell based on the first TA information. In some aspects, for example, the first TA information may include a TA value indicated by the RACH message. In some aspects, the first TA information may include a timing associated with the RACH message. The network node 606 may update the TA information associated with the at least one deactivated cell based on determining, based on the first TA information, an updated TA estimate corresponding to the at least one deactivated cell.

As shown by reference number 620, the network node 604 may transmit, and the UE 602 may receive, based on the configuration information, a cell activation command. A cell activation command may include a command associated with activation of a cell or deactivation of a cell. The cell activation command may include, for example, a joint TA and cell activation MAC CE that may indicate second TA information associated with the at least one deactivated cell. The second TA information may be based on the first TA information. For example, the second TA information may include the updated TA information associated with the at least one deactivated cell.

Using aspects of the techniques described herein, the RACH messages may be used to maintain current TA information at deactivated cells of TAGs including only deactivated cells, thereby reducing the signaling redundancy associated with transmitting RACH messages at the time of activation to obtain TA information for cell activation. Moreover, because the RACH message depicted in example 600 may be transmitted aperiodically, based on triggering by the network node 504, TA maintenance associated with deactivated cells may be performed without periodic signalling by the UE 502. In this way, some aspects may facilitate more efficient network communications.

As indicated above, FIG. 6 is provided as an example. Other examples may differ from what is described with respect to FIG. 6.

Figure 7:
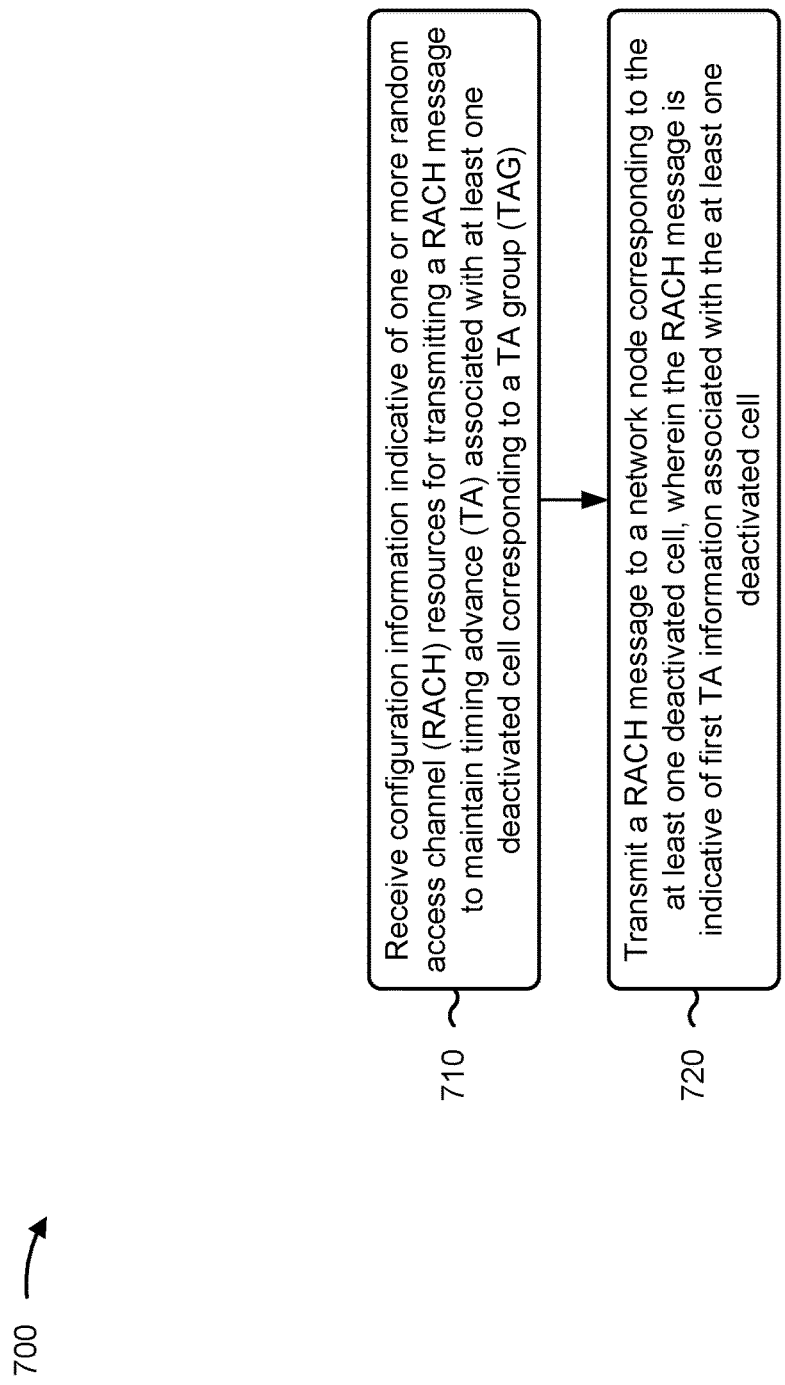
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 502 and/or UE 602) performs operations associated with techniques for TA maintenance for deactivated cells based on a RACH operation.

As shown in FIG. 7, in some aspects, process 700 may include receiving configuration information indicative of one or more RACH resources for transmitting a RACH message to maintain TA associated with at least one deactivated cell corresponding to a TAG (block 710). For example, the UE (e.g., using communication manager 908 and/or reception component 902, depicted in FIG. 9) may receive configuration information indicative of one or more RACH resources for transmitting a RACH message to maintain TA associated with at least one deactivated cell corresponding to a TAG, as described above.

As further shown in FIG. 7, in some aspects, process 700 may include transmitting a RACH message to a network node corresponding to the at least one deactivated cell, wherein the RACH message is indicative of first TA information associated with the at least one deactivated cell (block 720). For example, the UE (e.g., using communication manager 908 and/or transmission component 904, depicted in FIG. 9) may transmit a RACH message to a network node corresponding to the at least one deactivated cell, wherein the RACH message is indicative of first TA information associated with the at least one deactivated cell, as described above.

Process 700 may include additional aspects, such as any single aspect or any combination of aspects described below and/or in connection with one or more other processes described elsewhere herein.

In a first aspect, process 700 includes receiving a cell activation command from a network node associated with a source cell, wherein the cell activation command indicates second TA information based on the first TA information. In a second aspect, alone or in combination with the first aspect, the one or more RACH resources comprise at least one RACH occasion. In a third aspect, alone or in combination with the second aspect, the configuration information is indicative of a RACH occasion periodicity associated with the at least one RACH occasion.

In a fourth aspect, alone or in combination with one or more of the first through third aspects, the one or more RACH resources comprise at least one of a frequency domain resource or a time domain resource. In a fifth aspect, alone or in combination with one or more of the first through fourth aspects, the configuration information is indicative of the at least one deactivated cell. In a sixth aspect, alone or in combination with one or more of the first through fifth aspects, the configuration information is indicative of at least one additional cell corresponding to the TAG group. In a seventh aspect, alone or in combination with one or more of the first through sixth aspects, the configuration information is indicative of an additional deactivated cell corresponding to an additional TAG group, and process 700 includes transmitting an additional RACH message to a network node corresponding to the additional deactivated cell, wherein the additional RACH message is indicative of additional first TA information associated with the additional deactivated cell.

In an eighth aspect, alone or in combination with one or more of the first through seventh aspects, the configuration information is indicative of a periodic RACH transmission configuration corresponding to the RACH message and at least one additional RACH message, and process 700 includes transmitting the at least one additional RACH message in accordance with the periodic RACH transmission configuration. In a ninth aspect, alone or in combination with the eighth aspect, the RACH message comprises a dedicated random access sequence that indicates that the RACH message is associated with TA maintenance.

In a tenth aspect, alone or in combination with one or more of the first through ninth aspects, the configuration information is indicative of a plurality of RACH configurations, and process 700 includes receiving a switch indication that indicates a RACH configuration, of the plurality of RACH configurations, to be used. In an eleventh aspect, alone or in combination with the tenth aspect, receiving the switch indication comprises receiving DCI that includes the switch indication. In a twelfth aspect, alone or in combination with the tenth aspect, receiving the switch indication comprises receiving a MAC CE that includes the switch indication.

In a thirteenth aspect, alone or in combination with one or more of the first through twelfth aspects, process 700 includes receiving a PDCCH order to perform a RACH operation, wherein transmitting the RACH message comprises transmitting the RACH message based on receiving the PDCCH order. In a fourteenth aspect, alone or in combination with one or more of the first through thirteenth aspects, receiving the configuration information comprises receiving a PDCCH order to perform a RACH operation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
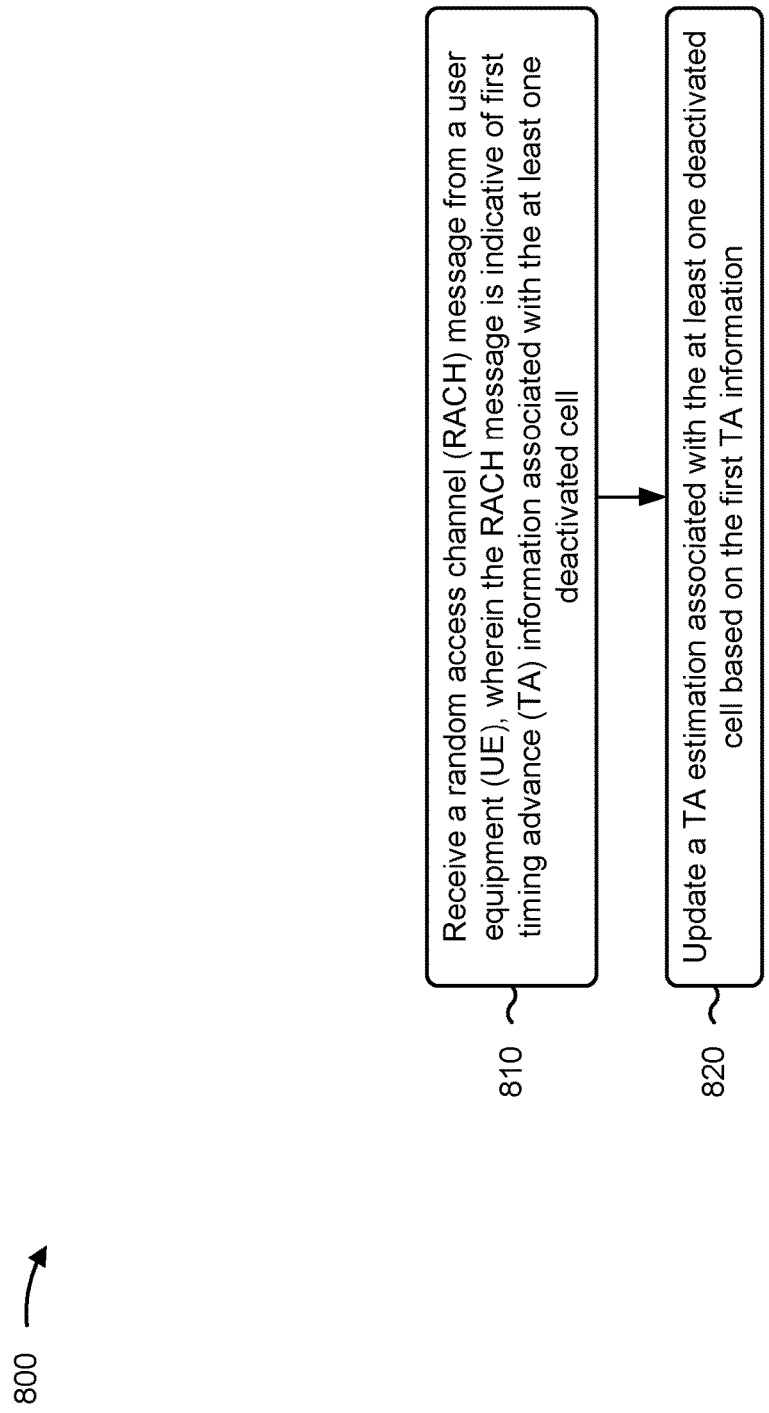
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 504 and/or 604) performs operations associated with techniques for TA maintenance for deactivated cells based on a RACH operation.

As shown in FIG. 8, in some aspects, process 800 may include receiving a RACH message from a UE, wherein the RACH message is indicative of first TA information associated with the at least one deactivated cell (block 810). For example, the network node (e.g., using communication manager 1008 and/or reception component 1002, depicted in FIG. 10) may receive a RACH message from a UE, wherein the RACH message is indicative of first TA information associated with the at least one deactivated cell, as described above.

As further shown in FIG. 8, in some aspects, process 800 may include updating a TA estimation associated with the at least one deactivated cell based on the first TA information (block 820). For example, the network node (e.g., using communication manager 1008 and/or updating component 1010, depicted in FIG. 10) may update a TA estimation associated with the at least one deactivated cell based on the first TA information, as described above.

Process 800 may include additional aspects, such as any single aspect or any combination of aspects described below and/or in connection with one or more other processes described elsewhere herein.

In a first aspect, process 800 includes transmitting a cell activation command associated with a source cell, wherein the cell activation command indicates second TA information based on the first TA information. In a second aspect, alone or in combination with the first aspect, process 800 includes transmitting configuration information indicative of one or more RACH resources for transmitting the RACH message to maintain TA associated with the at least one deactivated cell.

In a third aspect, alone or in combination with the second aspect, the one or more RACH resources comprise at least one RACH occasion. In a fourth aspect, alone or in combination with one or more of the second through third aspects, the configuration information is indicative of a RACH occasion periodicity associated with the at least one RACH occasion. In a fifth aspect, alone or in combination with one or more of the second through fourth aspects, the one or more RACH resources comprise at least one of a frequency domain resource or a time domain resource. In a sixth aspect, alone or in combination with one or more of the second through fifth aspects, the configuration information is indicative of the at least one deactivated cell. In a seventh aspect, alone or in combination with one or more of the second through sixth aspects, the configuration information is indicative of at least one additional cell corresponding to the TAG group. In an eighth aspect, alone or in combination with one or more of the first through seventh aspects, the configuration information is indicative of an additional deactivated cell corresponding to an additional TAG group, and process 800 includes receiving an additional RACH message associated with the additional deactivated cell, wherein the additional RACH message is indicative of additional first TA information associated with the additional deactivated cell.

In a ninth aspect, alone or in combination with one or more of the second through eighth aspects, the configuration information is indicative of a periodic RACH transmission configuration corresponding to the RACH message and at least one additional RACH message, and process 800 includes receiving the at least one additional RACH message in accordance with the periodic RACH transmission configuration. In a tenth aspect, alone or in combination with the ninth aspect, the RACH message comprises a dedicated random access sequence that indicates that the RACH message is associated with TA maintenance.

In an eleventh aspect, alone or in combination with one or more of the second through tenth aspects, the configuration information is indicative of a plurality of RACH configurations, and process 800 includes transmitting a switch indication that indicates a RACH configuration, of the plurality of RACH configurations, to be used. In a twelfth aspect, alone or in combination with eleventh aspect, transmitting the switch indication comprises transmitting DCI that includes the switch indication. In a thirteenth aspect, alone or in combination with the eleventh aspect, transmitting the switch indication comprises transmitting a MAC CE that includes the switch indication.

In a fourteenth aspect, alone or in combination with one or more of the first through thirteenth aspects, transmitting the configuration information comprises transmitting a PDCCH order to perform a RACH operation. In a fifteenth aspect, alone or in combination with one or more of the first through fourteenth aspects, process 800 includes transmitting a PDCCH order to perform a RACH operation, wherein receiving the RACH message comprises receiving the RACH message based on transmitting the PDCCH order.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
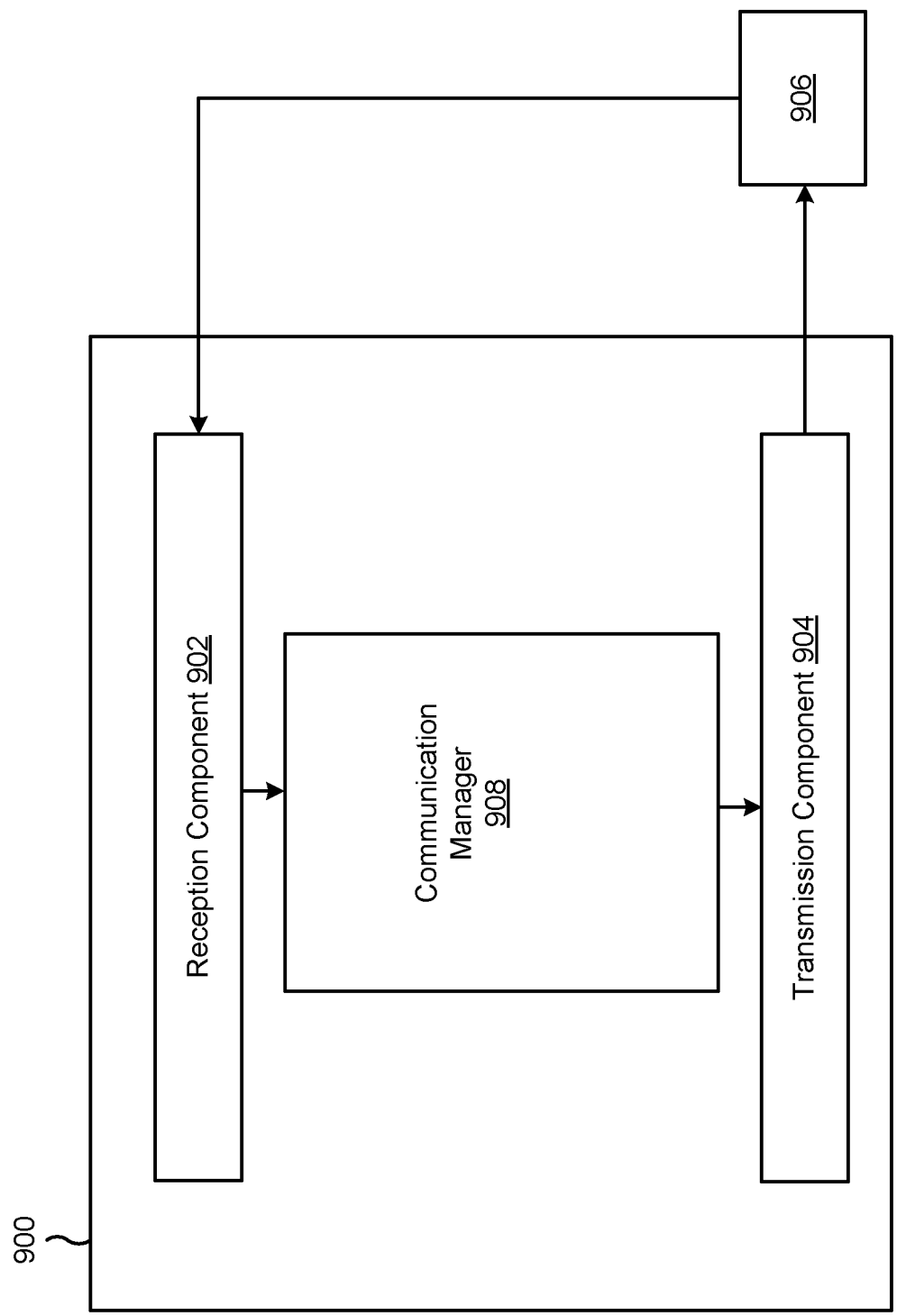
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 5 and 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 908 and/or the reception component 902 may receive configuration information indicative of one or more RACH resources for transmitting a RACH message to maintain TA associated with at least one deactivated cell corresponding to a TAG. In some aspects, the communication manager 908 may include one or more antennas, a modem, a controller/processor, a memory, or a combination thereof, of the UE described in connection with FIG. 2. In some aspects, the communication manager 908 may include the reception component 902 and/or the transmission component 904. In some aspects, the communication manager 908 may be, be similar to, include, or be included in, the communication manager 140 depicted in FIGS. 1 and 2.

The communication manager 908 and/or the transmission component 904 may transmit a RACH message to a network node corresponding to the at least one deactivated cell, wherein the RACH message is indicative of first TA information associated with the at least one deactivated cell. The communication manager 908 and/or the reception component 902 may receive a cell activation command from a network node associated with a source cell, wherein the cell activation command indicates second TA information based on the first TA information. The communication manager 908 and/or the reception component 902 may receive a PDCCH order to perform a RACH operation, wherein transmitting the RACH message comprises transmitting the RACH message based on receiving the PDCCH order.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
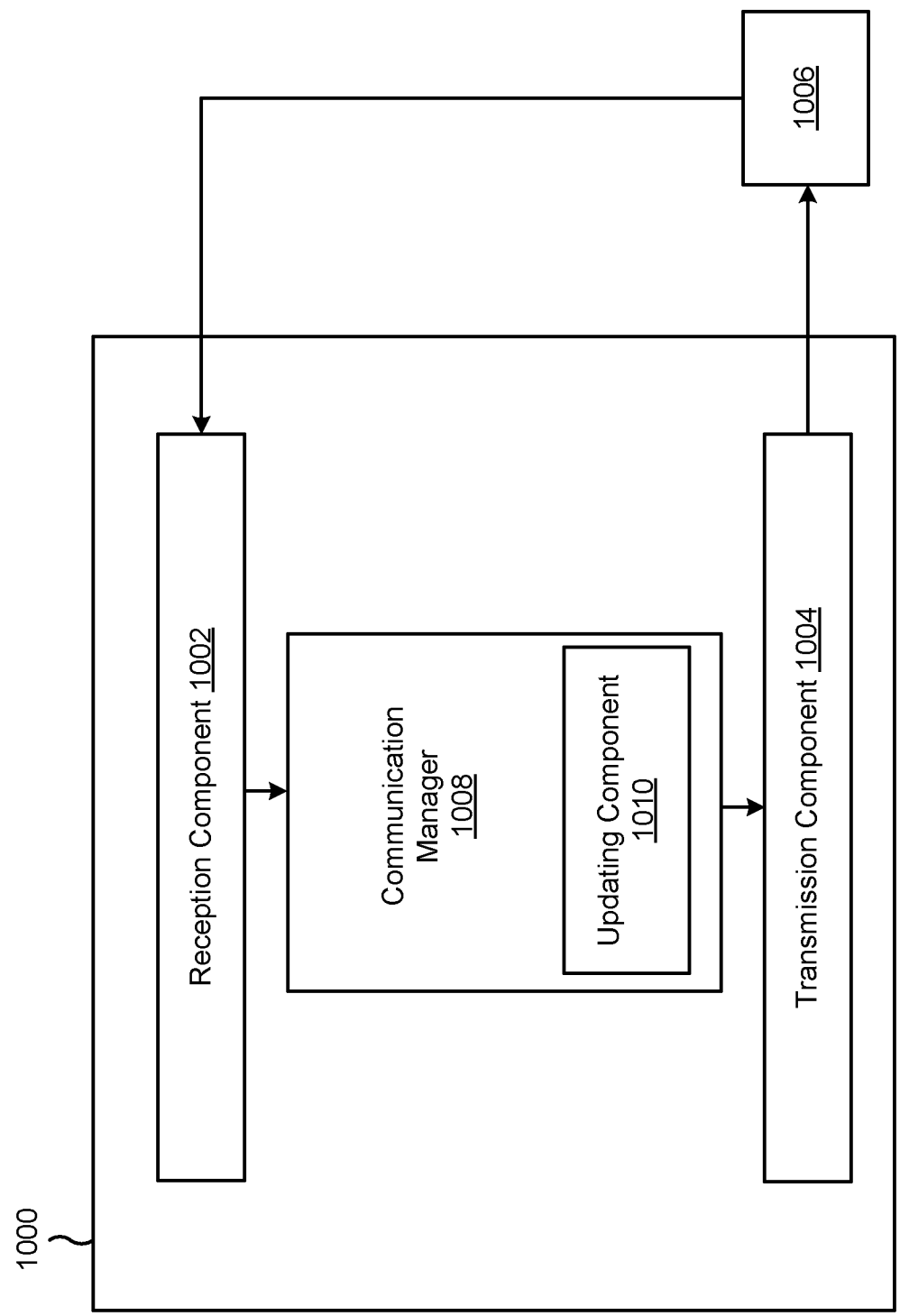
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008. The communication manager 1008 may include an updating component 1010.

In some aspects, the apparatus 1000 may be configured to perform one or more operations described herein in connection with FIGS. 5 and 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1008 and/or the reception component 1002 may receive a RACH message from a UE, wherein the RACH message is indicative of first TA information associated with the at least one deactivated cell. In some aspects, the communication manager 1008 may include one or more antennas, a modem, a controller/processor, a memory, or a combination thereof, of the network node described in connection with FIG. 2. In some aspects, the communication manager 1008 may include the reception component 1002 and/or the transmission component 1004. In some aspects, the communication manager 1008 may be, be similar to, include, or be included in, the communication manager 150 depicted in FIGS. 1 and 2.

The communication manager 1008 and/or the updating component 1010 may update a TA estimation associated with the at least one deactivated cell based on the first TA information. In some aspects, the updating component 1010 may include one or more antennas, a modem, a controller/processor, a memory, or a combination thereof, of the network node described in connection with FIG. 2. In some aspects, the updating component 1010 may include the reception component 1002 and/or the transmission component 1004.

The communication manager 1008 and/or the transmission component 1004 may transmit a cell activation command associated with a source cell, wherein the cell activation command indicates second TA information based on the first TA information. The communication manager 1008 and/or the transmission component 1004 may transmit configuration information indicative of one or more RACH resources for transmitting the RACH message to maintain TA associated with the at least one deactivated cell. The communication manager 1008 and/or the transmission component 1004 may transmit a PDCCH order to perform a RACH operation, wherein receiving the RACH message comprises receiving the RACH message based on transmitting the PDCCH order.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving configuration information indicative of one or more random access channel (RACH) resources for transmitting a RACH message to maintain timing advance (TA) associated with at least one deactivated cell corresponding to a TA group (TAG); and transmitting a RACH message to a network node corresponding to the at least one deactivated cell, wherein the RACH message is indicative of first TA information associated with the at least one deactivated cell.

Aspect 2: The method of Aspect 1, further comprising receiving a cell activation command from a network node associated with a source cell, wherein the cell activation command indicates second TA information based on the first TA information.

Aspect 3: The method of either of Aspects 1 or 2, wherein the one or more RACH resources comprise at least one RACH occasion.

Aspect 4: The method of Aspect 3, wherein the configuration information is indicative of a RACH occasion periodicity associated with the at least one RACH occasion.

Aspect 5: The method of any of Aspects 1-4, wherein the one or more RACH resources comprise at least one of a frequency domain resource or a time domain resource.

Aspect 6: The method of any of Aspects 1-5, wherein the configuration information is indicative of the at least one deactivated cell.

Aspect 7: The method of any of Aspects 1-6, wherein the configuration information is indicative of at least one additional cell corresponding to the TAG group.

Aspect 8: The method of any of Aspects 1-7, wherein the configuration information is indicative of an additional deactivated cell corresponding to an additional TAG group, the method further comprising transmitting an additional RACH message to a network node corresponding to the additional deactivated cell, wherein the additional RACH message is indicative of additional first TA information associated with the additional deactivated cell.

Aspect 9: The method of any of Aspects 1-8, wherein the configuration information is indicative of a periodic RACH transmission configuration corresponding to the RACH message and at least one additional RACH message, the method further comprising transmitting the at least one additional RACH message in accordance with the periodic RACH transmission configuration.

Aspect 10: The method of any of Aspects 1-9, wherein the RACH message comprises a dedicated random access sequence that indicates that the RACH message is associated with TA maintenance.

Aspect 11: The method of any of Aspects 1-10, wherein the configuration information is indicative of a plurality of RACH configurations, the method further comprising receiving a switch indication that indicates a RACH configuration, of the plurality of RACH configurations, to be used.

Aspect 12: The method of Aspect 11, wherein receiving the switch indication comprises receiving downlink control information that includes the switch indication.

Aspect 13: The method of Aspect 11, wherein receiving the switch indication comprises receiving a medium access control control element (MAC CE) that includes the switch indication.

Aspect 14: The method of any of Aspects 1-13, further comprising receiving a physical downlink control channel (PDCCH) order to perform a RACH operation, wherein transmitting the RACH message comprises transmitting the RACH message based on receiving the PDCCH order.

Aspect 15: The method of any of Aspects 1-14, wherein receiving the configuration information comprises receiving a physical downlink control channel (PDCCH) order to perform a RACH operation.

Aspect 16: A method of wireless communication performed by a network node associated with at least one deactivated cell corresponding to a timing advance group (TAG), comprising: receiving a random access channel (RACH) message from a user equipment (UE), wherein the RACH message is indicative of first timing advance (TA) information associated with the at least one deactivated cell; and updating a TA estimation associated with the at least one deactivated cell based on the first TA information.

Aspect 17: The method of Aspect 16, further comprising transmitting a cell activation command associated with a source cell, wherein the cell activation command indicates second TA information based on the first TA information.

Aspect 18: The method of either of Aspects 16 or 17, further comprising transmitting configuration information indicative of one or more RACH resources for transmitting the RACH message to maintain TA associated with the at least one deactivated cell.

Aspect 19: The method of Aspect 18, wherein the one or more RACH resources comprise at least one RACH occasion.

Aspect 20: The method of Aspect 19, wherein the configuration information is indicative of a RACH occasion periodicity associated with the at least one RACH occasion.

Aspect 21: The method of any of Aspects 18-20, wherein the one or more RACH resources comprise at least one of a frequency domain resource or a time domain resource.

Aspect 22: The method of any of Aspects 18-21, wherein the configuration information is indicative of the at least one deactivated cell.

Aspect 23: The method of any of Aspects 18-22, wherein the configuration information is indicative of at least one additional cell corresponding to the TAG group.

Aspect 24: The method of any of Aspects 18-23, wherein the configuration information is indicative of an additional deactivated cell corresponding to an additional TAG group, the method further comprising receiving an additional RACH message associated with the additional deactivated cell, wherein the additional RACH message is indicative of additional first TA information associated with the additional deactivated cell.

Aspect 25: The method of any of Aspects 18-24, wherein the configuration information is indicative of a periodic RACH transmission configuration corresponding to the RACH message and at least one additional RACH message, the method further comprising receiving the at least one additional RACH message in accordance with the periodic RACH transmission configuration.

Aspect 26: The method of any of Aspects 18-25, wherein the RACH message comprises a dedicated random access sequence that indicates that the RACH message is associated with TA maintenance.

Aspect 27: The method of any of Aspects 18-26, wherein the configuration information is indicative of a plurality of RACH configurations, the method further comprising transmitting a switch indication that indicates a RACH configuration, of the plurality of RACH configurations, to be used.

Aspect 28: The method of Aspect 27, wherein transmitting the switch indication comprises transmitting downlink control information that includes the switch indication.

Aspect 29: The method of Aspect 27, wherein transmitting the switch indication comprises transmitting a medium access control control element (MAC CE) that includes the switch indication.

Aspect 30: The method of any of Aspects 18-29, wherein transmitting the configuration information comprises transmitting a physical downlink control channel (PDCCH) order to perform a RACH operation.

Aspect 31: The method of any of Aspects 16-30, further comprising transmitting a physical downlink control channel (PDCCH) order to perform a RACH operation, wherein receiving the RACH message comprises receiving the RACH message based on transmitting the PDCCH order.

Aspect 32: An apparatus for wireless communication at a device, comprising a processor; memory coupled with the processor; and instructions stored in the memory and executable by the processor to cause the apparatus to perform the method of one or more of Aspects 1-15.

Aspect 33: A device for wireless communication, comprising a memory and one or more processors coupled to the memory, the one or more processors configured to perform the method of one or more of Aspects 1-15.

Aspect 34: An apparatus for wireless communication, comprising at least one means for performing the method of one or more of Aspects 1-15.

Aspect 35: A non-transitory computer-readable medium storing code for wireless communication, the code comprising instructions executable by a processor to perform the method of one or more of Aspects 1-15.

Aspect 36: A non-transitory computer-readable medium storing a set of instructions for wireless communication, the set of instructions comprising one or more instructions that, when executed by one or more processors of a device, cause the device to perform the method of one or more of Aspects 1-15.

Aspect 37: An apparatus for wireless communication at a device, comprising a processor; memory coupled with the processor; and instructions stored in the memory and executable by the processor to cause the apparatus to perform the method of one or more of Aspects 16-31.

Aspect 38: A device for wireless communication, comprising a memory and one or more processors coupled to the memory, the one or more processors configured to perform the method of one or more of Aspects 16-31.

Aspect 39: An apparatus for wireless communication, comprising at least one means for performing the method of one or more of Aspects 16-31.

Aspect 40: A non-transitory computer-readable medium storing code for wireless communication, the code comprising instructions executable by a processor to perform the method of one or more of Aspects 16-31.

Aspect 41: A non-transitory computer-readable medium storing a set of instructions for wireless communication, the set of instructions comprising one or more instructions that, when executed by one or more processors of a device, cause the device to perform the method of one or more of Aspects 16-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
receiving configuration information indicative of one or more random access channel (RACH) resources for transmitting a RACH message to maintain a timing advance (TA) associated with at least one deactivated cell corresponding to a TA group (TAG); and
transmitting the RACH message to a network node corresponding to the at least one deactivated cell, wherein the RACH message is indicative of a TA value associated with the at least one deactivated cell.

2. The method of claim 1, further comprising receiving a cell activation command from a network node associated with a source cell, wherein the cell activation command indicates TA information based on the the TA value.

3. The method of claim 1, wherein the one or more RACH resources comprise at least one RACH occasion.

4. The method of claim 3, wherein the configuration information is indicative of a RACH occasion periodicity associated with the at least one RACH occasion.

5. The method of claim 1, wherein the one or more RACH resources comprise at least one of a frequency domain resource or a time domain resource.

6. The method of claim 1, wherein the configuration information is indicative of the at least one deactivated cell.

7. The method of claim 1, wherein the configuration information is indicative of at least one additional cell corresponding to the TAG group.

8. The method of claim 1, wherein the configuration information is indicative of an additional deactivated cell corresponding to an additional TAG group, the method further comprising transmitting an additional RACH message to a network node corresponding to the additional deactivated cell, wherein the additional RACH message is indicative of TA information associated with the additional deactivated cell.

9. The method of claim 1, wherein the configuration information is indicative of a periodic RACH transmission configuration corresponding to the RACH message and at least one additional RACH message, the method further comprising transmitting the at least one additional RACH message in accordance with the periodic RACH transmission configuration.

10. The method of claim 9, wherein the RACH message comprises a dedicated random access sequence that indicates that the RACH message is associated with TA maintenance.

11. The method of claim 1, wherein the configuration information is indicative of a plurality of RACH configurations, the method further comprising receiving a switch indication that indicates a RACH configuration, of the plurality of RACH configurations, to be used.

12. The method of claim 11, wherein receiving the switch indication comprises receiving downlink control information that includes the switch indication.

13. The method of claim 11, wherein receiving the switch indication comprises receiving a medium access control control element (MAC CE) that includes the switch indication.

14. The method of claim 1, further comprising receiving a physical downlink control channel (PDCCH) order to perform a RACH operation, wherein transmitting the RACH message comprises transmitting the RACH message based on receiving the PDCCH order.

15. The method of claim 1, wherein receiving the configuration information comprises receiving a physical downlink control channel (PDCCH) order to perform a RACH operation.

16. A user equipment (UE) for wireless communication, comprising:
one or more memories; and
one or more processors, coupled to the one or more memories, configured to:
receive configuration information indicative of one or more random access channel (RACH) resources for transmitting a RACH message to maintain a timing advance (TA) associated with at least one deactivated cell corresponding to a TA group (TAG); and
transmit the RACH message to a network node corresponding to the at least one deactivated cell, wherein the RACH message is indicative of a TA value associated with the at least one deactivated cell.

17. The UE of claim 16, wherein the one or more processors are further configured to receive a cell activation command from a network node associated with a source cell, wherein the cell activation command indicates TA information based on the TA value.

18. The UE of claim 16, wherein the one or more RACH resources comprise at least one RACH occasion.

19. The UE of claim 16, wherein the configuration information is indicative of the at least one deactivated cell.

20. The UE of claim 16, wherein the configuration information is indicative of at least one additional cell corresponding to the TAG group.

21. The UE of claim 16, wherein the configuration information is indicative of an additional deactivated cell corresponding to an additional TAG group, and wherein the one or more processors are further configured to transmit an additional RACH message to a network node corresponding to the additional deactivated cell, wherein the additional RACH message is indicative of TA information associated with the additional deactivated cell.

22. The UE of claim 16, wherein the configuration information is indicative of a periodic RACH transmission configuration corresponding to the RACH message and at least one additional RACH message, wherein the one or more processors are further configured to transmit the at least one additional RACH message in accordance with the periodic RACH transmission configuration.

23. The UE of claim 16, wherein the RACH message comprises a dedicated random access sequence that indicates that the RACH message is associated with TA maintenance.

24. The UE of claim 16, wherein the configuration information is indicative of a plurality of RACH configurations, wherein the one or more processors are further configured to receive a switch indication that indicates a RACH configuration, of the plurality of RACH configurations, to be used.

25. The UE of claim 16, wherein the one or more processors are further configured to receive a physical downlink control channel (PDCCH) order to perform a RACH operation, wherein the one or more processors, to transmit the RACH message, are configured to transmit the RACH message based on receiving the PDCCH order.

26. The UE of claim 16, wherein the one or more processors, to receive the configuration information, are configured to receive a physical downlink control channel (PDCCH) order to perform a RACH operation.

27. A non-transitory computer-readable medium storing a set of instructions for wireless communication, the set of instructions comprising:
   one or more instructions that, when executed by one or more processors of a user equipment (UE), cause the UE to:
      receive configuration information indicative of one or more random access channel (RACH) resources for transmitting a RACH message to maintain a timing advance (TA) associated with at least one deactivated cell corresponding to a TA group (TAG); and
      transmit the RACH message to a network node corresponding to the at least one deactivated cell, wherein the RACH message is indicative of a TA value associated with the at least one deactivated cell.

28. The non-transitory computer-readable medium of claim 27, wherein the one or more instructions further cause the UE to receive a cell activation command from a network node associated with a source cell, wherein the cell activation command indicates TA information based on the TA value.

29. An apparatus for wireless communication, comprising:
   means for receiving configuration information indicative of one or more random access channel (RACH) resources for transmitting a RACH message to maintain a timing advance (TA) associated with at least one deactivated cell corresponding to a TA group (TAG); and
   means for transmitting the RACH message to a network node corresponding to the at least one deactivated cell, wherein the RACH message is indicative of a TA value associated with the at least one deactivated cell.

30. The apparatus of claim 29, further comprising means for receiving a cell activation command from a network node associated with a source cell, wherein the cell activation command indicates TA information based on the TA value.

* * * * *